UNITED STATES PATENT OFFICE.

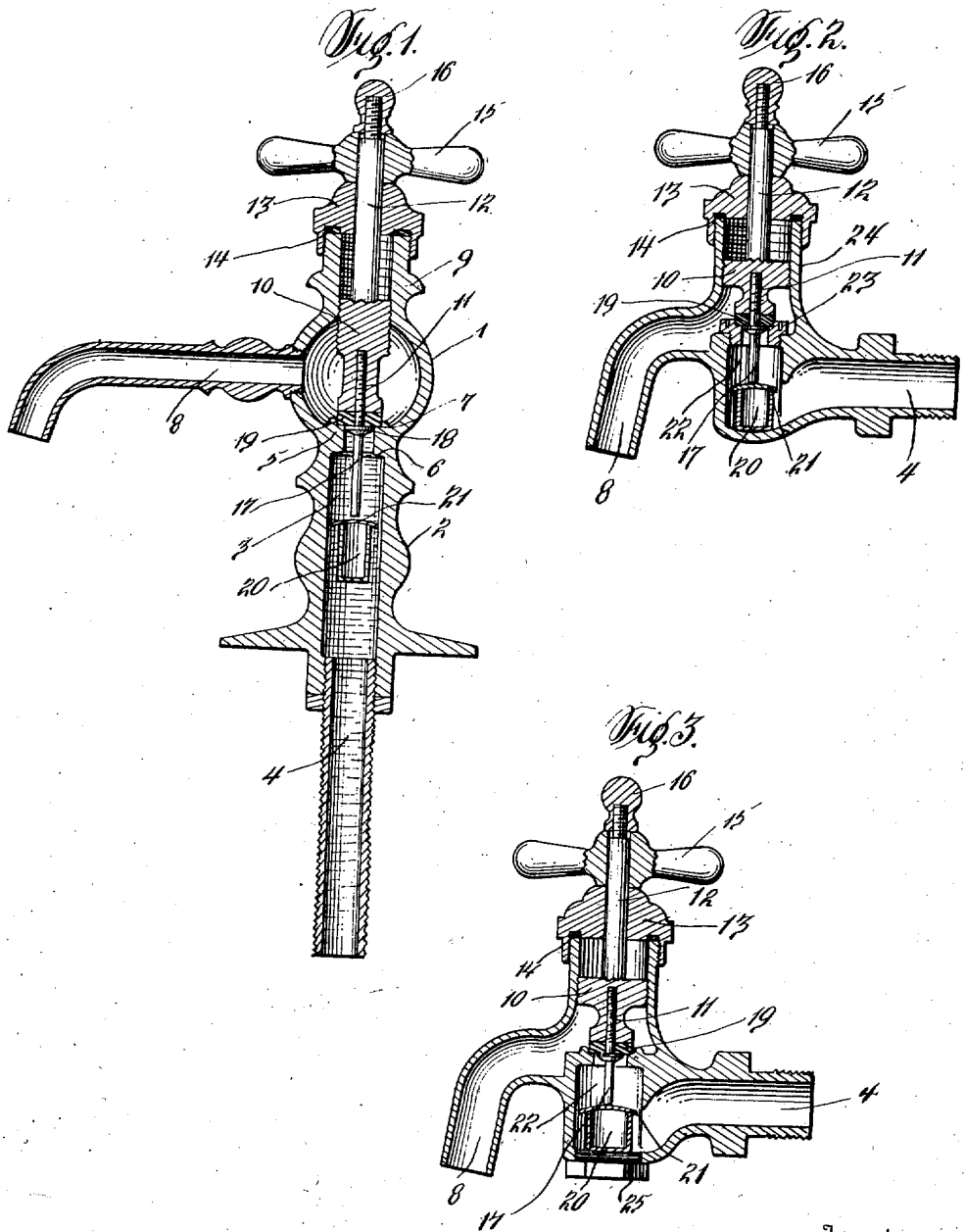

CHARLES T. BOWN AND THOMAS E. SMITH, OF PITTSBURG, PENNSYLVANIA.

FAUCET.

957,647.

Specification of Letters Patent. Patented May 10, 1910.

Application filed July 27, 1909. Serial No. 509,892.

*To all whom it may concern:*

Be it known that we, CHARLES T. BOWN and THOMAS E. SMITH, citizens of the United States of America, residing at Pittsburg, in the county of Allegheny and State of Pennsylvania, have invented certain new and useful Improvements in Faucets, of which the following is a specification, reference being had therein to the accompanying drawing.

This invention relates to faucets and spigots, and the invention has for its primary object to provide a faucet with simple and effective means for automatically shutting off the faucet when the plug or valve stem thereof is removed for packing the stuffing box or renewing the washer employed for maintaining a non-leakable connection between the body of the faucet and the adjustable plug or stem thereof.

A further object of the invention is to provide a faucet for spigots with a pressure actuated valve adapted to be seated to close the faucet when the plug or valve stem thereof is removed.

The present type of faucet necessitates the shutting off of the supply of water while the packing thereof is removed, thus causing considerable trouble and delay, particularly in houses and hotels where a large number of faucets are used. In devising our improvement we aim to obviate the necessity of shutting off the water other than in the faucet to be repaired, consequently we facilitate the work of the plumber and eliminate all inconvenience incurred by repairing a faucet.

Our invention will be hereinafter considered in detail and then claimed.

Reference will now be had to the drawing forming part of the specification wherein is illustrated the preferred embodiments of the invention, but it is to be understood that the structural elements thereof can be varied or changed as to the size, shape, and manner of assemblage without departing from the spirit of the invention.

In the drawings, Figure 1 is a vertical sectional view of a faucet constructed in accordance with our invention. Fig. 2 is a vertical sectional view of a spigot showing a modification of the invention, and Fig. 3 is a similar view of a still further modified form of the invention.

In the drawings 1 denotes the body of a faucet as commonly used in connection with wash stands and basins, the body being supported by a pedestal 2 having a central vertical chamber 3 into the lower end of which is tapped a water supply pipe 4. The upper end of the chamber 3 terminates at an annular shoulder 5 having the lower edges thereof provided with valve seats 6 and the upper edges with valve seat 7.

The valve body 1 is provided with a spout or outlet 8 and with a vertical interiorly threaded extension 9. Screwed into the extension 9 and adapted to be adjusted therein is a valve plug 10 having the lower end thereof provided with an interiorly threaded socket 11, while the upper end is formed integral with the stem 12, said stem extending through a cap 13 secured upon the upper end of the extension 9. Mounted upon the upper end of the extension 9 is a gasket or washer 14 serving functionally as a packing to establish a non-leakable connection between the cap 13 and the extension 9. Mounted upon the upper end of the stem 12 is a handle 15, said handle being retained upon said stem by a cap 16.

Detachably mounted in the socket 11 is a depending rod 17 provided intermediate the ends thereof with a peripheral flange 18. Interposed between the flange 18 and the plug 10 is a resilient washer 19 serving as a valve and adapted to engage in the seat 7. Mounted in the chamber 3 is a float valve which consists of a buoyant body portion 20 carrying on its upper end a valve disk 21 of greater diameter than said body 20 whereby the disk will project therefrom. The valve disk 21 is convexed on the outer surface thereof and is adapted to engage a seat 6 which is also convexed in contour.

As shown in Fig. 1 of the drawings the faucet is closed and the pressure of water within the chamber 3 is adapted to maintain the valve disk 21 against the lower end of the rod 17.

The plug 10 can be elevated to open the faucet and allow water to pass through the spout 8, without the float valve engaging the seat 6; the rod 17 of the plug 10 holding the float valve off the seat. When the plug 10 is elevated and removed from the extension 9 of the valve body 1, the rod 17 releases the float valve and allows the pressure of water within the chamber 3 to seat the float valve and shut off the supply of water to the valve body 1. The supply of water is shut off until the plug 10 is replaced and the rod 17 lowers the valve disk 21.

In Figs. 2 and 3 of the drawings we have illustrated the principle of our invention as applied to spigots, the spigot in Fig. 2 of the drawing having the body thereof enlarged to provide a chamber 22 for the float valve. In order that the float valve can be placed within the chamber, the valve body is provided with a detachable valve seat 23 placed in position through the medium of the valve extension 24 and a suitable spanner wrench (not shown).

As shown in Fig. 3 of the drawings access is had to the chamber 22 for placing the float valve through the medium of a plug 25 adjustably mounted in the lower end of the chamber 22. In connection with either spigot the operation of the float valve is the same as of the faucet shown in Fig. 1.

Having now described our invention, what we claim as new is:

1. In a faucet, the combination of a body-portion having an upper and a lower interiorly-arranged valve seat, said body-portion having an inlet chamber and an outlet chamber, a removable plug mounted in the outlet chamber and adapted to engage said upper valve seat for shutting off communication between the two chambers, a rod fixed to said plug and extending in said inlet chamber, a valve arranged within said inlet chamber and adapted to engage said lower valve seat when said rod is elevated, said valve being convexo-concave in cross-section, and a buoyant body depending from said valve and of less diameter than said inlet chamber and adapted to automatically move said valve to engagement with said lower seat when said rod is removed from the inlet chamber whereby communication will be cut off between the inlet and the outlet chamber.

2. In a faucet, the combination of a body-portion having an upper and a lower interiorly-arranged valve seat, said body-portion having an inlet chamber and an outlet chamber, a removable plug mounted in the outlet chamber and adapted to engage said upper valve seat for shutting off communication between the two chambers, a rod fixed to said plug and extending in said inlet chamber, a valve arranged within said inlet chamber and adapted to engage said lower valve seat when said rod is elevated, said valve being convexo-concave in cross-section, a buoyant body depending from said valve and of less diameter than said inlet chamber and adapted to automatically move said valve to engagement with said lower seat when said rod is removed from the inlet chamber whereby communication will be cut off between the inlet and the outlet chamber, an inlet communicating with the lower end of said inlet chamber, and an outlet communicating at its inner end with said outlet chamber, the inner end of said outlet being above the plane of the inner end of the inlet.

In testimony whereof we affix our signatures in the presence of two witnesses:

CHARLES T. BOWN.
THOMAS E. SMITH.

Witnesses:
DAVID FURNIER,
MAX H. SROLOVITZ.